US007070502B1

(12) United States Patent
Bussick et al.

(10) Patent No.: US 7,070,502 B1
(45) Date of Patent: Jul. 4, 2006

(54) GAMING DEVICE HAVING DUAL EVALUATION SCHEME

(75) Inventors: William J. Bussick, Sparks, NV (US); Paulina Glavich, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/687,689

(22) Filed: Oct. 13, 2000

(51) Int. Cl.
*A63F 13/00* (2006.01)

(52) U.S. Cl. ........................................................ 463/20

(58) Field of Classification Search ............ 463/16–20, 463/9–13; 273/138.1, 139, 143 R, 292
See application file for complete search history.

(56) References Cited

U.S. PATENT DOCUMENTS

| | | | | |
|---|---|---|---|---|
| 4,743,022 A | | 5/1988 | Wood | 273/85 CP |
| 5,332,228 A | | 7/1994 | Schultz | |
| 5,423,539 A | | 6/1995 | Nagao | 273/143 R |
| 5,431,408 A | | 7/1995 | Adams | 273/306 |
| 5,449,173 A | | 9/1995 | Thomas et al. | 273/143 R |
| 5,762,552 A | * | 6/1998 | Vuong et al. | 463/17 |
| 5,823,873 A | | 10/1998 | Moody | 463/13 |
| 5,873,781 A | | 2/1999 | Keane | 463/22 |
| 6,089,977 A | | 7/2000 | Bennett | 463/20 |
| 6,120,031 A | | 9/2000 | Adams | 273/292 |
| 6,120,378 A | | 9/2000 | Moody | 463/20 |
| 6,159,095 A | | 12/2000 | Frohm et al. | 463/19 |
| 6,165,070 A | | 12/2000 | Nolte et al. | 463/20 |
| 6,190,254 B1 | | 2/2001 | Bennett | 463/13 |
| 6,290,600 B1 | * | 9/2001 | Glasson | 463/20 |
| 6,299,165 B1 | | 10/2001 | Nagano | 273/143 R |
| 6,439,993 B1 | * | 8/2002 | O'Halloran | 463/16 |
| 6,517,432 B1 | * | 2/2003 | Jaffe | 463/16 |
| 6,551,187 B1 | * | 4/2003 | Jaffe | 463/20 |
| 6,604,740 B1 | | 8/2003 | Singer et al. | |
| 6,616,142 B1 | | 9/2003 | Adams | |
| 2002/0193160 A1 | * | 12/2002 | Tarantino | 463/20 |

FOREIGN PATENT DOCUMENTS

| | | | | |
|---|---|---|---|---|
| AU | 722 969 B | | 8/2000 | |
| EP | 0060019 A1 | * | 9/1982 | |
| EP | 0 984 408 A2 | | 3/2000 | |
| GB | 2101380 A | * | 1/1983 | |
| WO | WO 9732285 | | 9/1997 | |
| WO | WO 00/66235 | | 11/2000 | |
| WO | WO 0076606 A1 | | 12/2000 | |

OTHER PUBLICATIONS

Merriam-Webster's Collegiate Dictionary, 1999, Merriam-Webster, Incorporated, Tenth Edition, p. 131.*

(Continued)

*Primary Examiner*—Scott Jones
(74) *Attorney, Agent, or Firm*—Bell, Boyd & Lloyd LLC

(57) ABSTRACT

The present invention is a method for evaluating a player's award in a game wherein one symbol of the gaming device changes into another. In one embodiment, the present invention provides all awards for predetermined symbols and combinations thereof, including winning combinations produced by a wild symbol. In a second step, the game awards all awards for predetermined symbols and combinations thereof produced after the wild symbol has changed one or more non-wild symbols to a wild symbol. This step includes awarding the player for combinations previously awarded in the first step, which may or may not have been the result of the wild symbol.

20 Claims, 9 Drawing Sheets

OTHER PUBLICATIONS

Enchanted Forest Brochures published by Aristocrat, Inc. in 1995, undated.

Break the Spell Brochure, Article and Website Page published by Atronic Americas, LLC, Strictly Slots in 1999, 2000 and website printed on Jan. 15, 2001.

Munsters Article and Website Page published by Strictly Slots, IGT,undated, website printed on Mar. 21, 2001.

Haywire Game Feature Description published by IGT, undated.

* cited by examiner

GAMING DEVICE HAVING DUAL EVALUATION SCHEME

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a wildcard symbol that affects other symbols in a same row, column or set as said wild card symbol, and wherein the game exercises two evaluations in determining the player's award.

BACKGROUND OF THE INVENTION

It is well known in the gaming industry to replace one symbol for another. In video poker, for example, the player discards unwanted cards (or symbols) and keeps desired cards (or symbols). Another well known concept related to symbol changing is the wildcard or wild symbol. A conventional wild symbol normally operates to stand for each and every non-wild symbol of the game, so that the wild symbol produces any win that each non-wild symbol or each combination having that non-wild symbol produces, wherein the combination is created in conjunction with other non-wild symbols.

Referring to FIGS. 3A through 3C, three screens of a central display device 30 (described in FIGS. 1A and 1B) illustrate the known operation of a wild symbol. Screen 30 of FIG. 3A illustrates a wild symbol "W", a heart and a cherry on one payline or one row of symbols of a slot machine gaming device. If the only non-wild symbols that the game includes are the heart and the cherry, then screens 30 of FIGS. 3B and 3C illustrate the complete effect of the wild symbol "W". Screen 30 of FIG. 3B figuratively illustrates that the wild symbol stands for or in the place of a heart symbol on the payline or row of symbols. Screen 30 of FIG. 3C figuratively illustrates that the wild symbol stands for or in the place of the cherry symbol on the payline or row of symbols.

It is also known to provide a gaming device that changes one or more non-wild symbols into a wild symbol, whereafter the changed wild symbol stands for each and every non-wild symbol of the game. For example, in a base game of a gaming device having a plurality of reels and displaying a plurality of rows of symbols, known gaming devices can change one or more non-wild symbols on the same reel as a randomly generated wildcard symbol.

Wildcards or wild symbols are well known in base games as well as bonus games of gaming devices. For example, in video poker, a wildcard can stand in the place of any other numbered or face card. A wildcard can turn two sevens into three of a kind. A wildcard can also produce a "straight" in a hand otherwise having four of the set including an ace, king, queen, jack and a ten.

PCT application No. PCT/AU97/00121 entitled, Slot Machine Game with Roaming Wild Card, having a publication date of Sep. 4, 1997, discloses a bonus game example.

In this application, a slot machine having a video display contains a plurality of rotatable reels with game symbols. When the player receives a triggering symbol or combination, the game produces a bonus or wild symbol. The bonus or wild symbol moves from game symbol to game symbol temporarily changing the game symbol to a wild symbol. If the change results in a winning combination, the player receives an award.

In known non-bonus gaming systems, i.e., in the base game having a plurality of reels, the games evaluate the effect of a wild symbol one time. Thus, if a wildcard creates a new winning combination on a payline of a known slot machine, wherein the payline already contains a winning combination separate and apart from the new winning combination via the wildcard, the known slot machine will pay the separate winning combination once and the new combination once via the wild symbol. That is, in known games, the reels spin, any winning combinations are paid, and the wild symbols produce additional pays. The games, however, do not perform a total re-evaluation and pay all combinations again.

In general, gaming machines count winning combinations once. That is, when one or more symbols change and potentially create one or more new winning combinations, known games will credit the player for winning combinations prior to the change and then the new winning combinations, but will not repay non-changing combinations on a second evaluation. Gaming device manufacturers constantly strive to develop new games and new and exciting ways to award players.

SUMMARY OF THE INVENTION

The present invention provides a method for evaluating a player's award in a game, wherein one symbol of the gaming device changes into another. Specifically, the present invention provides a new method of evaluating winning combinations of symbols when one or more of the symbols changes and a winning combination exists before the change and a new winning combination exists after the change. The present invention applies to a gaming device having one or more reels, wherein each reel has a plurality of symbols. The present invention also applies to a bonus round of a gaming device, wherein the bonus round displays a plurality of changeable symbols. The present invention further applies to any video card game wherein one card having a symbol or number replaces another of such cards.

The present invention preferably employs a video monitor, wherein the symbols are simulated and changing the symbols includes replacing one simulated symbol with another preferably through an entertaining and exciting method. Alternatively, the present invention can employ a mechanical symbol display having a mechanism to change the symbols or a method to indicate that a symbol has changed.

In one preferred embodiment, the present invention provides a method for evaluating a player's award in a game wherein one wild symbol turns other symbols wild. The method of the present invention involves a two step award evaluation. In one step, the game provides all awards for predetermined symbols and combinations thereof, including winning combinations produced by a wild symbol. If the player receives a winning combination coupled with the wild symbol, the first step pays for both the winning combination and the winning combination coupled with the wild symbol. The wild symbol can function alternatively, such as standing in the place of certain symbols but not in place of each symbol of the gaming device.

In a second step, the game awards all awards for predetermined symbols and combinations thereof produced after the wild symbol has changed one or more non-wild symbols to a wild symbol. This step includes awarding the player for combinations previously awarded in the first step, which may or may not have been the result of the wild symbol. The preferred embodiment applies to symbol generating gaming devices, such as slot machines, as well as video card gaming machines that generate playing cards having number or face card symbols.

In another embodiment, the present invention provides a method for evaluating a player's award in a game wherein one symbol substitutes for or replaces another symbol. The method again involves a two step award evaluation. In one step, the game provides all awards for predetermined symbols and combinations thereof, before the substitution or replacement. In a second step, the game provides all awards for predetermined symbols and combinations thereof produced after the substitution or replacement. This step includes awarding the player for combinations previously awarded in the first step, which remain after the substitution or replacement. This embodiment also applies to slot machines as well as video card games.

It is therefore an object of the present invention to provide a gaming device wherein one symbol substitutes for or replaces another symbol, and wherein the game provides awards for all winning symbols and winning combinations of symbols before said substitution or replacement and for all winning symbols and combinations of winning symbols after said substitution or replacement.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
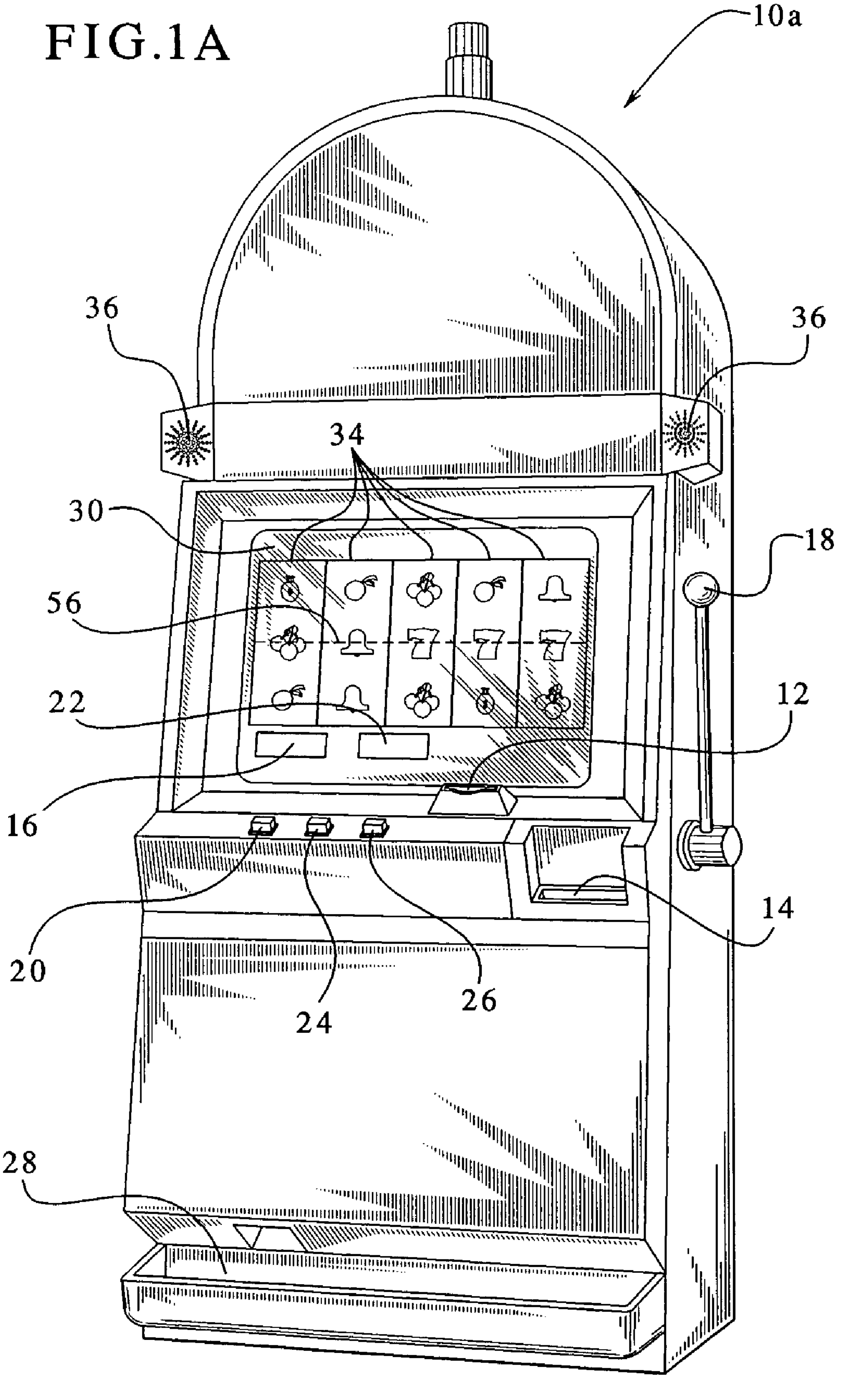
FIG. 1A is a perspective view of one embodiment of the gaming device of the present invention.
Figure 1B:
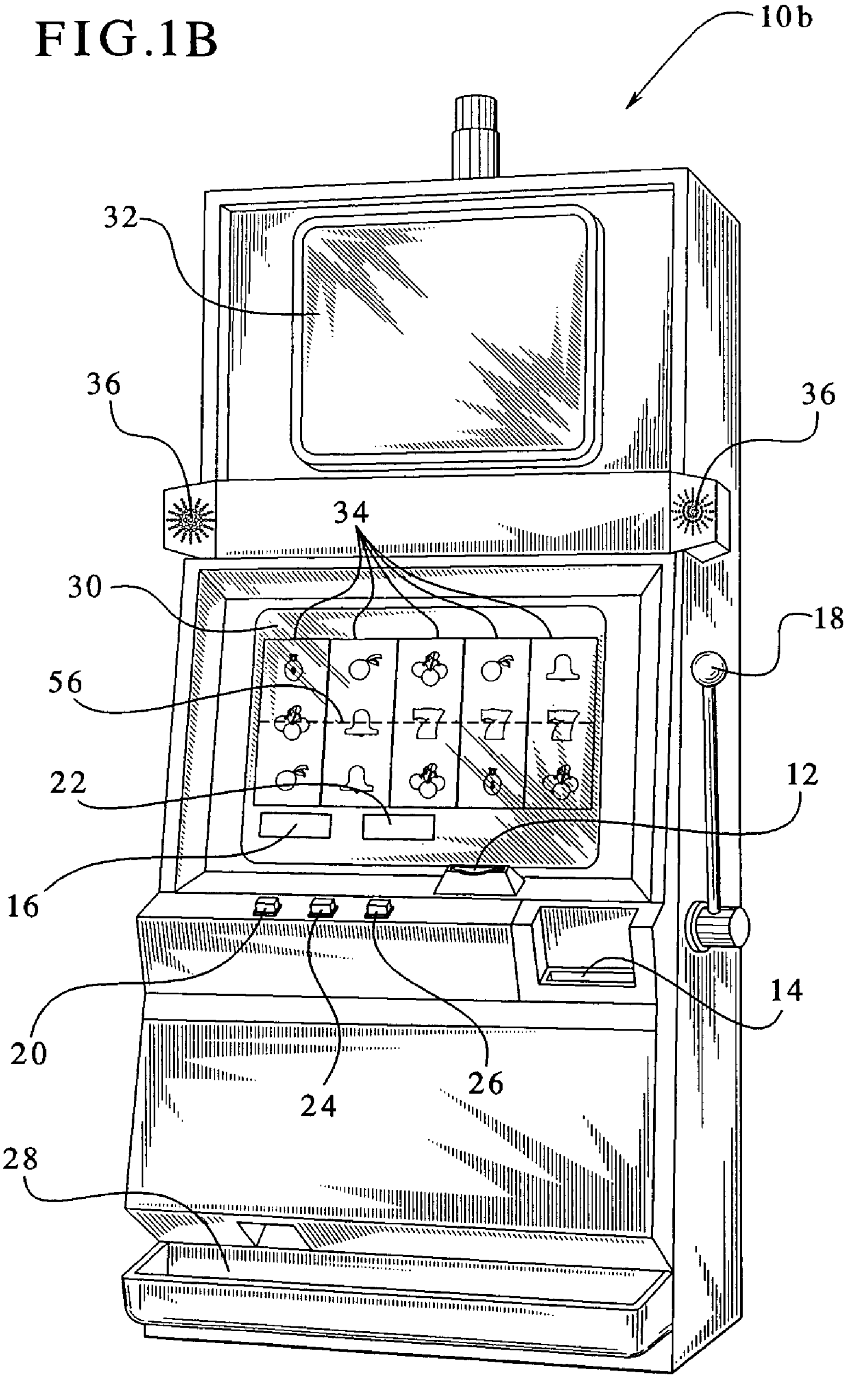
FIG. 1B is a perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or a ticket voucher in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player, which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit vouchers redeemable by a cashier or electronically recordable cards, which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other static or dynamic display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
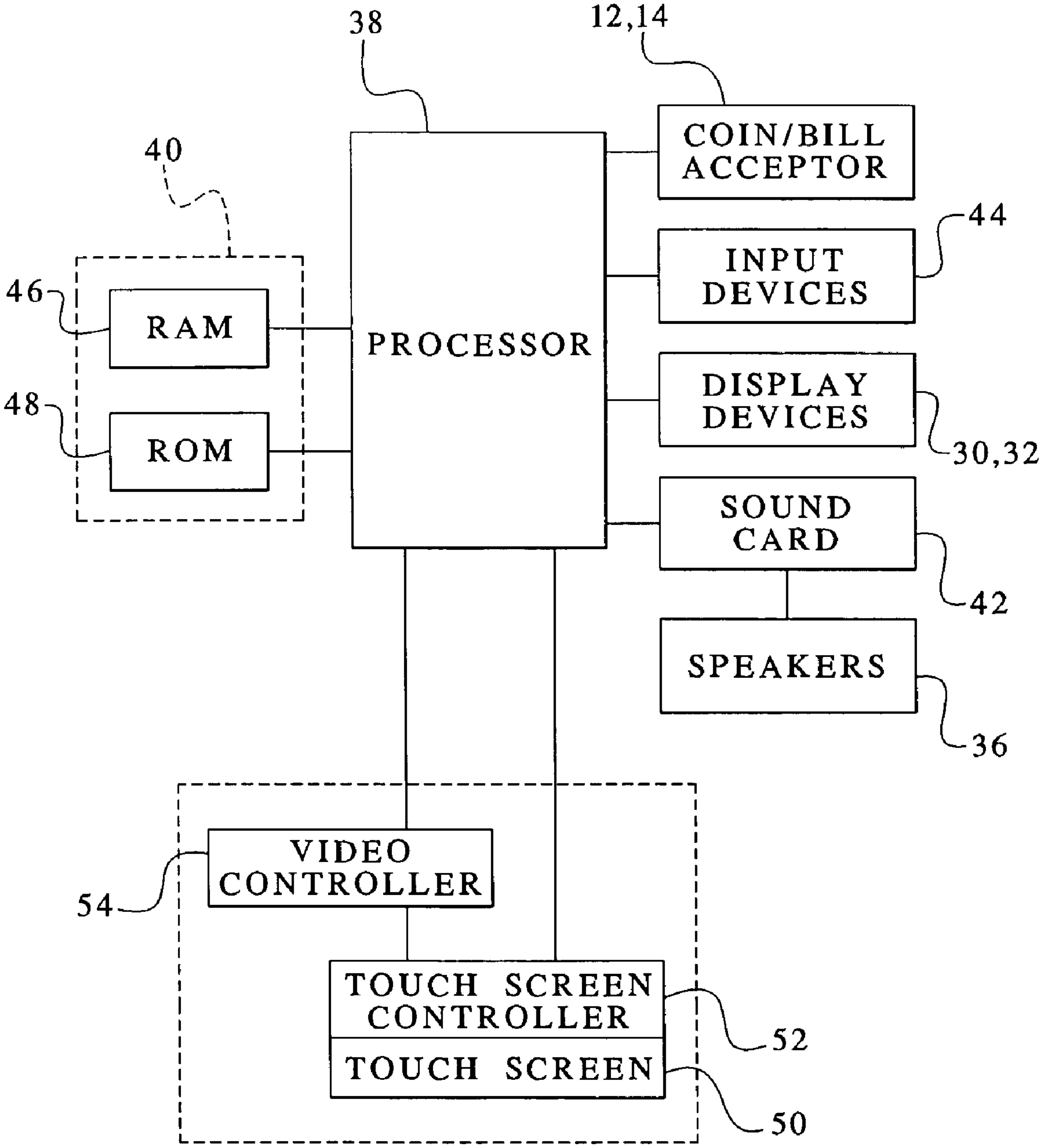
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random-access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 are generally referred to herein as the "computer" or the "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Preferred Method—Slot Machine Embodiment

Figure 4:
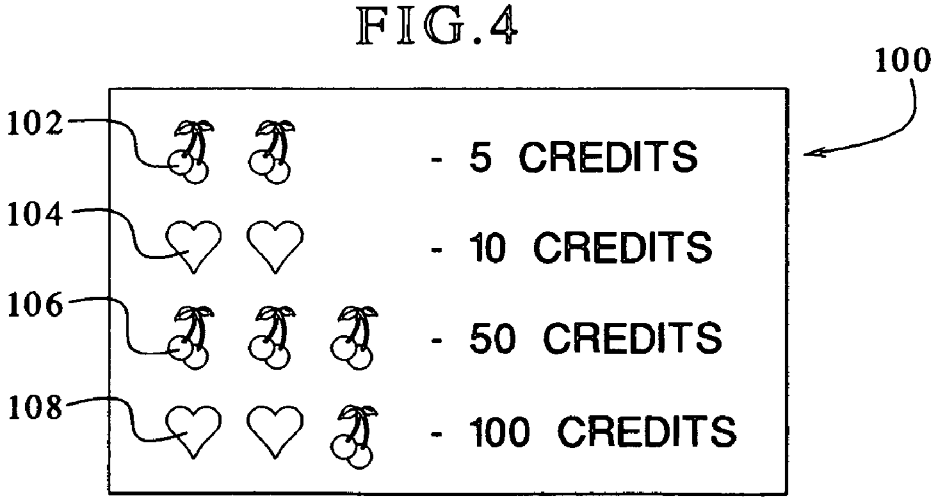
FIG. 4 is a front elevational view of a display device having a sample paytable, which includes a plurality of winning symbol combinations for a slot machine of the present invention.

Referring now to FIG. 4, a well known paytable 100 having a plurality of winning symbol combinations that will aid in the description of the present invention is illustrated. All gaming devices, including slot, poker and other card machines include some form of winning symbol list or paytable that informs the player of symbols or symbol combinations that produce an award for the player. On gaming device 10*b*, for example, the upper display device 32 can contain the paytable. Paytable 100 includes: a winning combination 102 of two cherries that yields five credits to the player; a winning combination 104 of two hearts that yields ten credits to the player; a winning combination 106 of three cherries that yields fifty credits to the player; and a winning combination 108 of two hearts and a cherry that yields one hundred credits to the player.

Figure 5A:
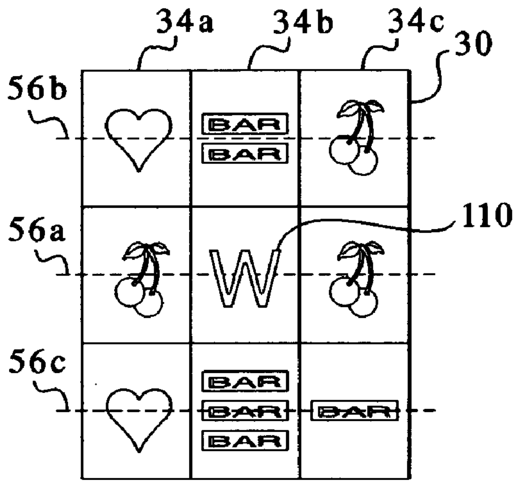
FIGS. 5A and 5B are front elevational views of a display device including the preferred method of the present invention in a slot machine embodiment, wherein a preferably randomly generated wild symbol replaces every other non-wild symbol on a reel associated with the wild symbol.
Figure 5B:
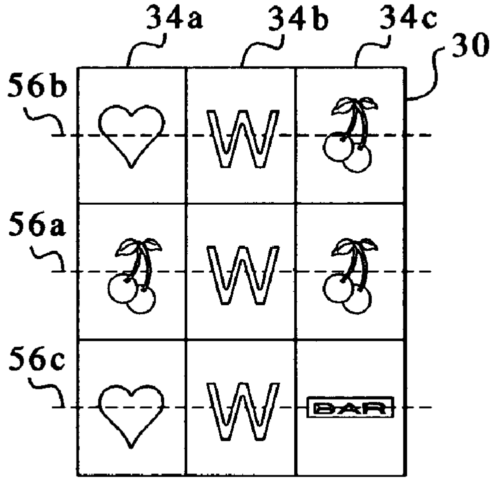

Referring now to FIGS. 5A and 5B, one preferred method of the present invention is disclosed in a slot machine embodiment. FIGS. 5A and 5B both include the central display device 30, three reels 34*a*, 34*b* and 34*c* and three paylines 56*a*, 56*b* and 56*c*. FIGS. 5A and 5B illustrate a plurality of randomly generated symbols, some of which, namely the heart and the cherry, are located on the paytable 100 of FIG. 4. The paytable 100 of FIG. 4 is to be used in conjunction with the description of FIGS. 5A and 5B.

FIG. 5A also includes a preferably randomly generated wild symbol 110 shown as a "W" on reel 34*b* and payline 56*a*. FIG. 5B illustrates that the game of the present example maintains a feature whereby the randomly appearing wild symbol 110 on the central display device 30, as indicated by FIG. 5A, in turn replaces or substitutes for every display symbol on the wild symbol's associated reel, 34*b*, as indicated by FIG. 5B. The preferred method of the present invention evaluates the player's winnings, according to a predetermined paytable, in two steps.

Figure 3A:
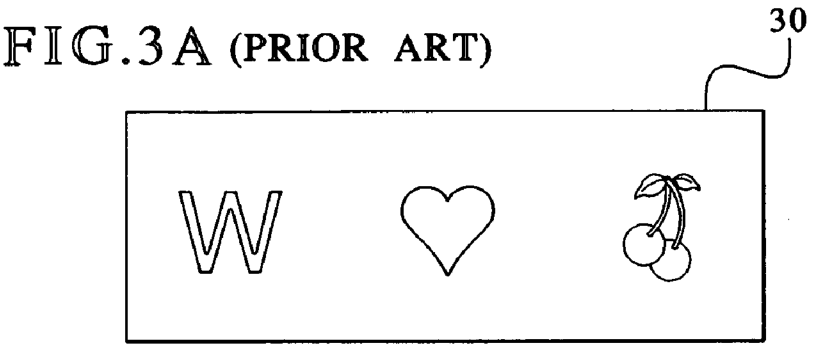
FIG.3A (PRIOR ART)
FIGS. 3A through 3C are schematic views of three screens of a display device illustrating the prior or known effect of a wild symbol.
Figure 3B:
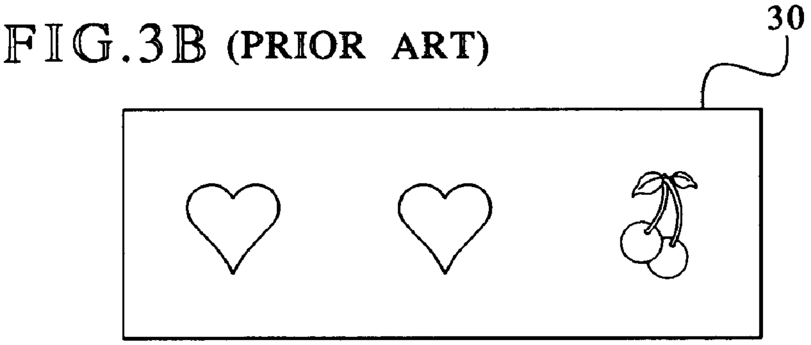
FIG.3B (PRIOR ART)
Figure 3C:
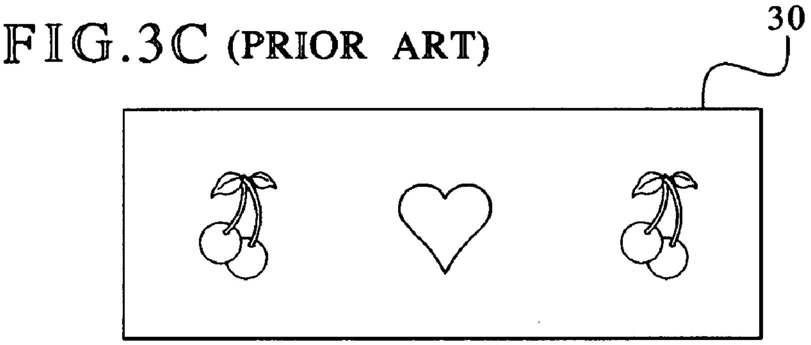
FIG.3C (PRIOR ART)

In a first step, one preferred method of the present invention evaluates or finds all winning symbols and symbol combinations before the wild symbol replaces or substitutes for any other symbols. The wild symbol 110 on reel 34*b* and payline 56*a* of FIG. 5A preferably has the effect described above in FIGS. 3A and 3B. The wild symbol stands in the place of a cherry symbol and/or a heart symbol. Along payline 56*a*, then, the player wins fifty credits for the three cherries appearing on the reels 34*a*, 34*b* and 34*c*. Paylines 56*b* and 56*c* produce no winning combinations.

The first step of the method of the present invention provides fifty overall credits to the player. It should be appreciated that the first step can alternatively not give the wild symbol the effect described in FIGS. 3A and 3B, namely to stand in the place of all non-wild symbols, and still award credits for any award generating non-wild symbol or combinations. It should also be appreciated that the implementor of the present invention can design one or more reels or otherwise design a game wherein the player is guaranteed or predetermined to obtain one or more wild symbols. For instance, in FIGS. 5A and 5B, the implementor can place a wild symbol 110 on every third position of a reel, so that the player is guaranteed to receive one wild symbol 110 on that reel. It should further be appreciated that the present invention contemplates any award including but not limited to credits, multipliers, a number of picks from an award set or any combination thereof.

In a second step, one preferred method of the present invention evaluates or finds all winning symbols and symbol combinations after the wild symbol 110 replaces the other symbols. The wild symbol "W" on reel 34*b* and paylines 56*a*, 56*b* and 56*c* of FIG. 5B have the effect described above in FIGS. 3A and 3B. Along payline 56*a*, as before, the player wins fifty credits for the three cherries appearing on the reels 34*a*, 34*b* and 34*c*. Along payline 56*b*, the player now wins 100 credits for the two hearts and a cherry appearing on the reels 34*a*, 34*b* and 34*c*. Along payline 56*c*, the player now wins ten credits for a heart—heart combination appearing on reels 34*a* and 34*b*.

The second step of the method of the present invention provides 160 overall credits to the player. Both steps provide 210 credits to the player. It should be appreciated that any award produced in the first step is included or counted again in the second step along with any new winning symbol or symbol combinations produced by the expanding wild symbol. In this example the awards produced along payline 56*a* are included or counted again in the second step.

FIGS. 5A and 5B disclose one preferred method of the present invention in a slot machine embodiment, wherein a preferably randomly generated wild symbol 110 replaces every other symbol on a reel associated with or containing the wild symbol 110. In a preferred embodiment of the preferred method of the present invention, the game places one or more wild symbols 110 on the middle three of five reels. The present invention can place wild symbols 110 on any number and combination of reels. The present invention also applies to a plurality of different situations, wherein the wild symbol can replace different associated non-wild symbols as discussed in detail below.

Figure 6A:
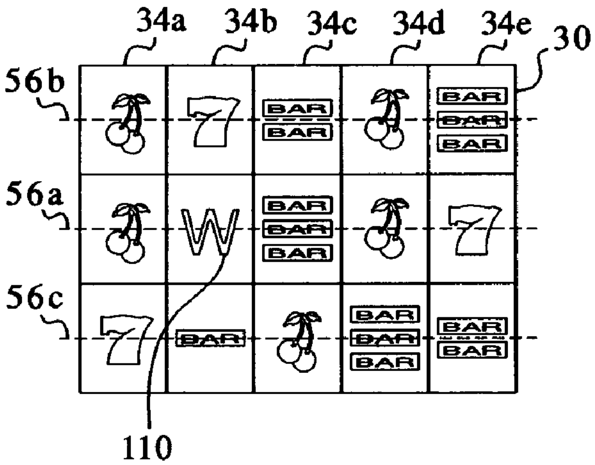
FIGS. 6A and 6B are front elevational views of a display device including the preferred method of the present invention in a slot machine embodiment, wherein a preferably randomly generated wild symbol replaces one or more, but not all, non-wild symbols on a row associated with the wild symbol.
Figure 6B:
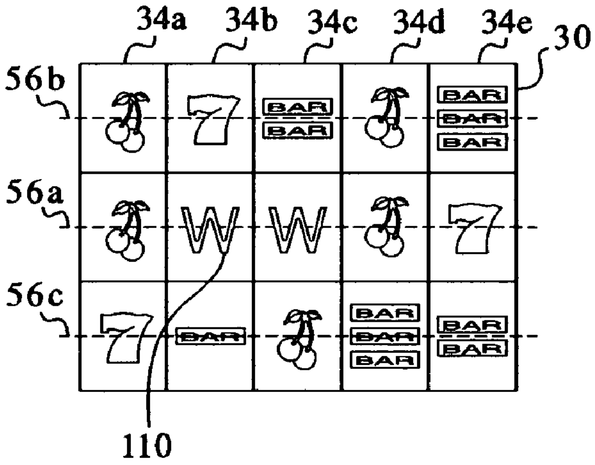

Referring now to FIGS. 6A and 6B, one preferred method of the present invention is illustrated in a slot machine embodiment, wherein a preferably randomly generated wild symbol 110 on a central display device 30 replaces one or more, but not all, non-wild symbols on a row associated with or containing the wild symbol 110. FIGS. 6A and 6B include five reels 34*a* through 34*e* and three paylines 56*a* through 56*c*. FIG. 6B illustrates a wild symbol on reel 34*c* and payline 56*a* replacing a three-bar symbol on the same position in FIG. 6A. The present invention contemplates a symbol replacement to the left or right of the preferably randomly generated wild symbol 110. The symbol replacement is preferably but does not have to be adjacent to the generated wild symbol 110. The embodiment of FIGS. 6A and 6B contemplates any number, less than all, of symbol replacements on an associated row.

Figure 7A:
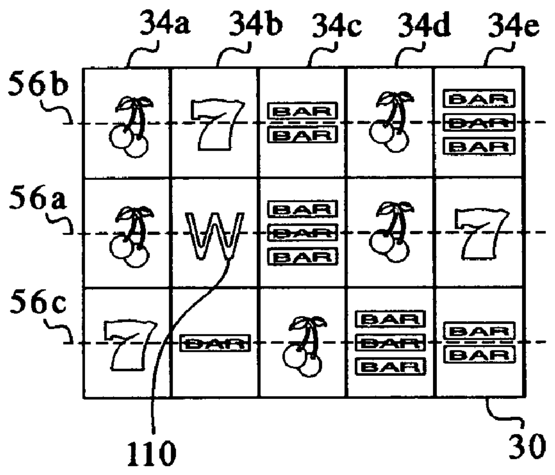
FIGS. 7A and 7B are front elevational views of a display device including the preferred method of the present invention in a slot machine embodiment, wherein a preferably randomly generated wild symbol replaces all the non-wild symbols on a row associated with the wild symbol.
Figure 7B:
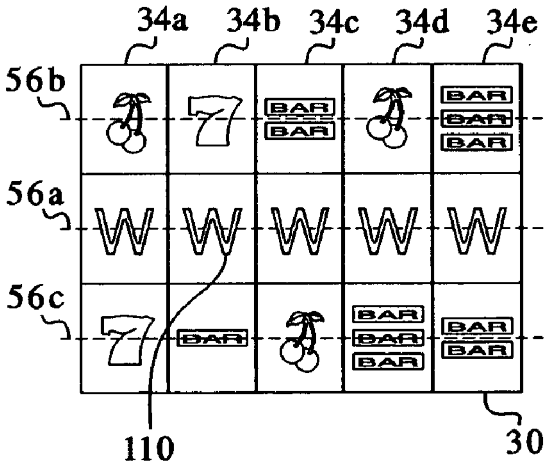

Referring to FIGS. 7A and 7B, one preferred method of the present invention is illustrated in a slot machine embodiment, wherein a preferably randomly generated wild symbol 110 on a central display device 30 replaces all the non-wild symbols on a row associated with or containing the wild symbol 110. FIGS. 7A and 7B include five reels 34*a* through 34*e* and three paylines 56*a* through 56*c*. FIG. 7B illustrates wild symbols on reels 34*a*, 34*c*, 34*d* and 34*e* and payline 56*a* replacing the respective symbols having the same positions in FIG. 7A.

Figure 8A:
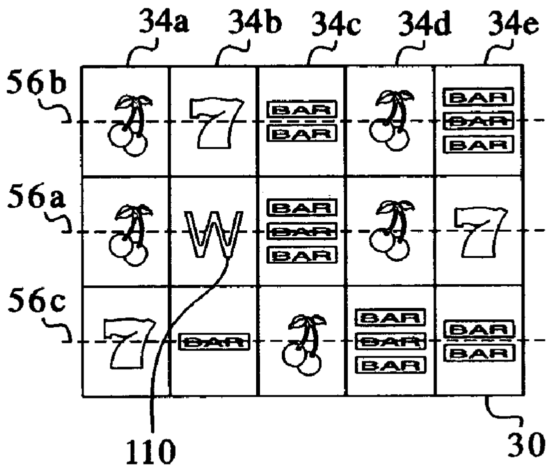
FIGS. 8A and 8B are front elevational views of a display device including the preferred method of the present invention in a slot machine embodiment, wherein a preferably randomly generated wild symbol replaces one or more, but not all, non-wild displayed symbols on a reel associated with the wild symbol.
Figure 8B:
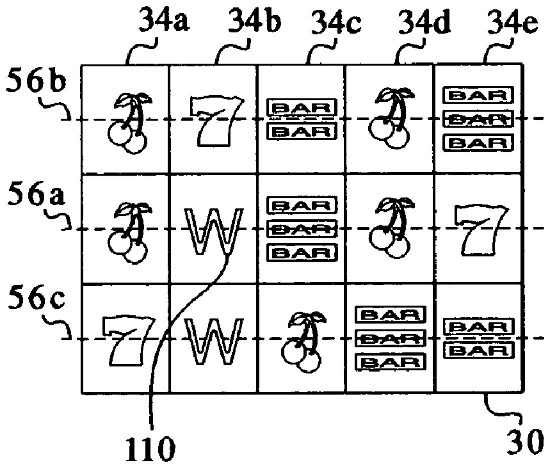

Referring to FIGS. 8A and 8B, one preferred method of the present invention is illustrated in a slot machine embodiment, wherein a preferably randomly generated wild symbol 110 on a central display device 30 replaces one or more, but not all, non-wild displayed symbols on a reel associated with or containing the wild symbol 110. FIGS. 8A and 8B include five reels, 34*a* through 34*e*, and three paylines, 56*a* through 56*c*. FIG. 8B illustrates a wild symbol on reel 34*b* and payline 56*c* replacing a one-bar symbol on the same position in FIG. 8A. The present invention contemplates a symbol replacement on the top or bottom of the preferably randomly generated wild symbol 110. The symbol replacement is preferably, but does not have to be adjacent to the generated wild symbol 110. The embodiment of FIGS. 8A and 8B contemplates any number, less than all, of displayed symbol replacements on an associated reel. It should be appreciated that the earlier embodiment of FIGS. 5A and 5B illustrated and contemplated replacing all non-wild displayed symbols on an associated reel.

Figure 9A:
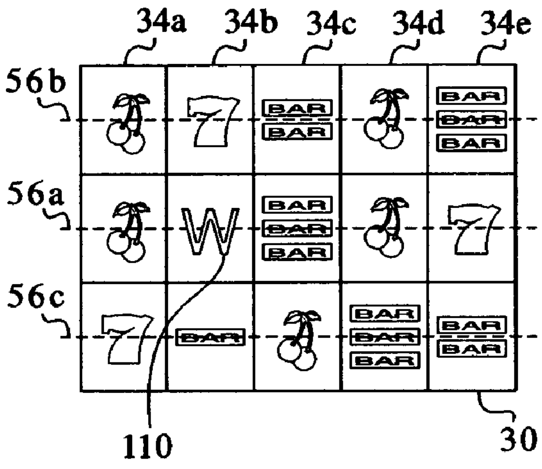
FIGS. 9A and 9B are front elevational views of a display device including the preferred method of the present invention in a slot machine embodiment, wherein a preferably randomly generated wild symbol replaces one or more, but not all, non-wild displayed symbols on a row and reel associated with the wild symbol.
Figure 9B:
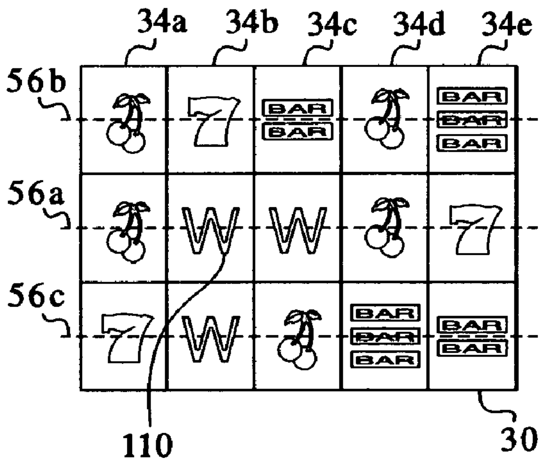

Referring to FIGS. 9A and 9B, one preferred method of the present invention is illustrated in a slot machine embodiment, wherein a preferably randomly generated wild symbol 110 on a central display device 30 replaces one or more, but not all, non-wild displayed symbols on a row and reel associated with or containing the wild symbol 110. FIGS. 9A and 9B include five reels 34*a* through 34*e* and three paylines 56*a* through 56*c*. FIG. 9B illustrates a wild symbol on reel 34*b* and payline 56*c* replacing a one-bar symbol on the same position in FIG. 9A. FIG. 9B also illustrates a wild symbol on reel 34*c* and payline 56*a* replacing a three-bar symbol on the same position in FIG. 9A. The present invention contemplates a symbol replacement on the top, bottom, left or right of the preferably randomly generated wild symbol 110. The symbol replacement is preferably but does not have to be adjacent to the generated wild symbol 110. The embodiment of FIGS. 9A and 9B contemplates any number, less than all, of displayed symbol replacements on an associated row and reel.

Figure 10A:
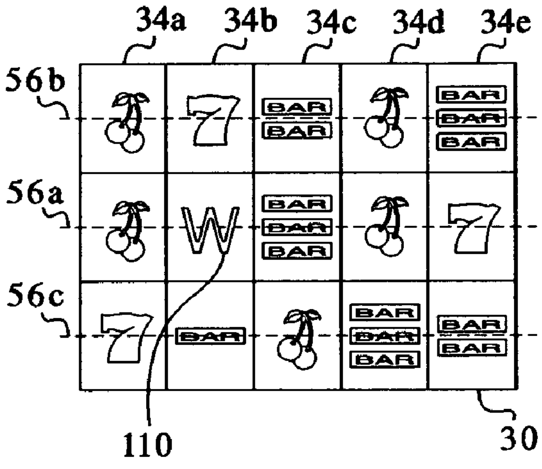
FIGS. 10A and 10B are front elevational views of a display device including the preferred method of the present invention in a slot machine embodiment, wherein a preferably randomly generated wild symbol replaces all the non-wild symbols on a row and a reel associated with the wild symbol.
Figure 10B:
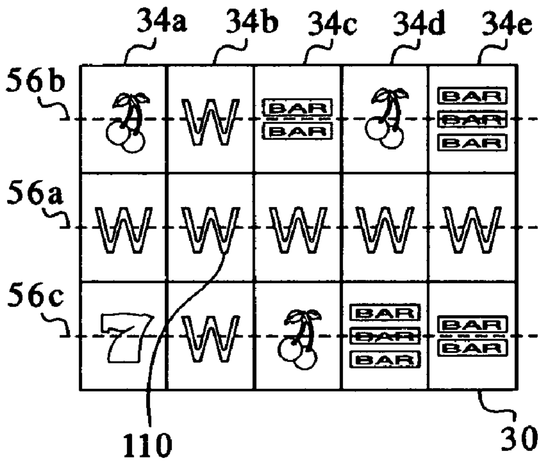

Referring to FIGS. 10A and 10B, the preferred method of the present invention is illustrated in a slot machine embodiment, wherein a preferably randomly generated wild symbol 110 on a central display device 30 replaces all the non-wild symbols on a row and a reel associated with or containing the wild symbol 110. FIGS. 10A and 10B include five reels 34*a* through 34*e* and three paylines 56*a* through 56*c*. FIG. 10B illustrates wild symbols on reels 34*a*, 34*c*, 34*d* and 34*e* and payline 56*a* replacing the respective symbols having the same positions in FIG. 10A. FIG. 10B also illustrates wild symbols on paylines 56*b* and 56*c* and reel 34*b* replacing the respective symbols having the same positions in FIG. 10A.

Referring to the embodiments of FIGS. 7A and 7B and 10A and 10B, the game replaced all non-wild symbols of a payline, namely payline 56*a*, when the game replaced all the non-wild symbols of the row associated with payline 56*a*. It should first be appreciated that the present invention contemplates replacing every non-wild symbol of a row of symbols without replacing every non-wild symbol of a payline at the same time. The present invention also contemplates replacing every non-wild symbol on a payline even if the payline is completely diagonal or has a diagonal component.

Figure 11A:
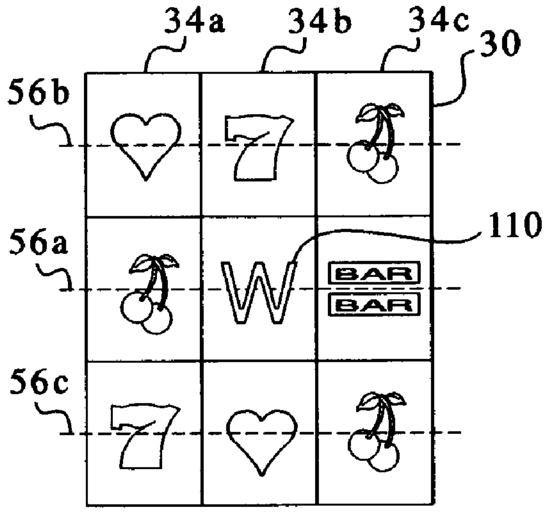
FIGS. 11A and 11B are front elevational views of a display device including the preferred method of the present invention in a slot machine embodiment, wherein a preferably randomly generated wild symbol replaces all displayed non-wild symbols of a particular kind.
Figure 11B:
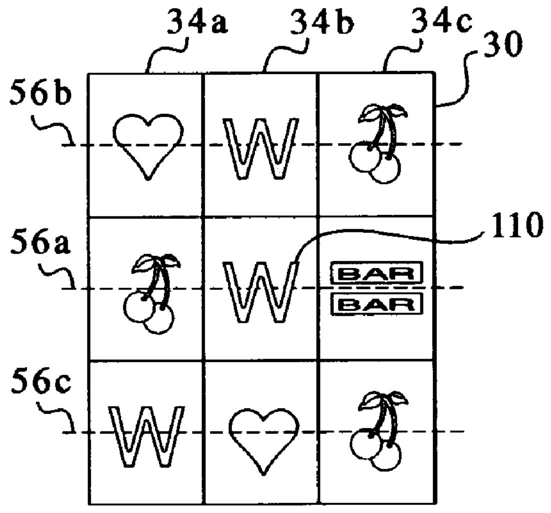

Referring to FIGS. 11A and 11B, the preferred method of the present invention is illustrated in a slot machine embodiment, wherein a preferably randomly generated wild symbol 110 on a central display device 30 replaces all displayed non-wild symbols of a particular kind. In this example, the generated wild symbol 110 replaces all generated "7" symbols. FIGS. 11A and 11B include three reels 34*a* through 34*c* and three paylines 56*a* through 56*c*. FIG. 11B illustrates wild symbols on the position of reel 34*a* and payline 56*c* and on the position of reel 34*b* and payline 56*b* replacing the "7" symbols having the same positions in FIG. 11A. It should be appreciated that the game can replace more than one symbol, such as the seven and the heart in FIG. 11A.

FIGS. 11A and 11B illustrate that the present invention can replace non-wild symbols occurring on reels and in rows not associated or not including the generated wild symbol 110. It should be appreciated that the present invention contemplates the game replacing or substituting one or more symbols of a reel, row, diagonal line of symbols or any combination thereof unassociated with or not containing the generated wild symbol 110.

Preferred Method—Poker Game Embodiment

Figure 12:
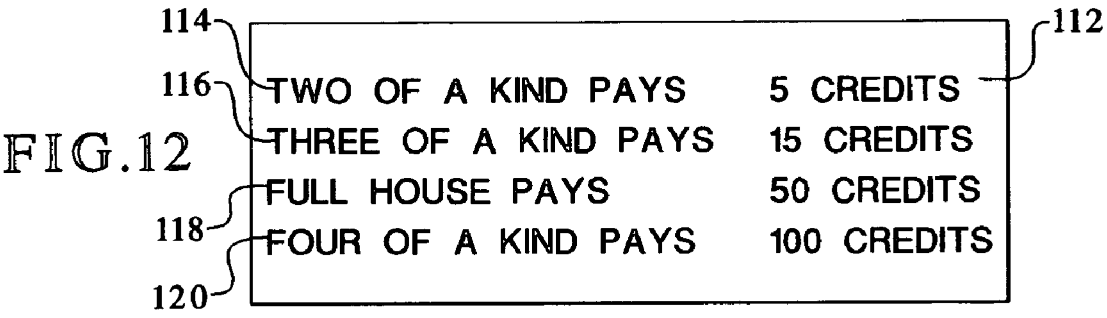
FIG. 12 is a front elevational view of a display device having a sample paytable, which includes a plurality of winning playing card combinations for a poker game embodiment of the present invention.

Referring now to FIG. 12, a well known paytable 112 having a plurality of winning playing card symbol combinations that will aid in the description of the card game embodiment is illustrated. The card game embodiment is illustrated as a well known five card draw poker game, wherein the player receives points or credits for achieving predetermined combinations of playing card values or symbols.

As before, the paytable 112 can appear on the upper display device 32. Paytable 112 includes: a winning combination 114 of two of a kind (of any playing card values or symbols) that yields five credits to the player; a winning combination 116 of three of a kind that yields fifteen credits to the player; a winning combination 118 of a full house (two of a kind plus three of a kind) that yields fifty credits to the player; and a winning combination 120 of four of a kind that yields 100 credits to the player. Although not shown, paytable 112 can also provide an award for obtaining any single playing card, such as an ace.

Figure 13:
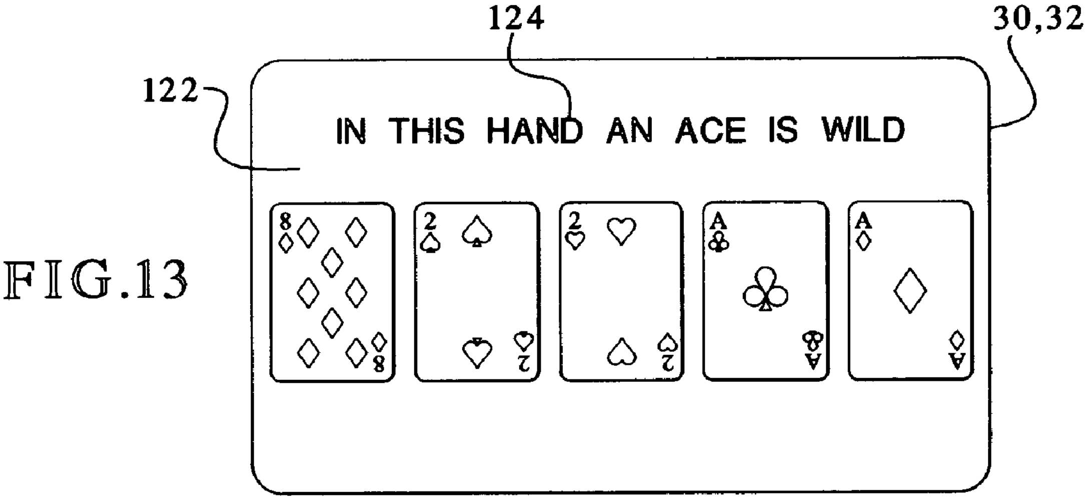
FIG. 13 is a front elevational view of a display device including the preferred method of the present invention in a poker game or card game embodiment.

Referring now to FIG. 13, the preferred method of the present invention is disclosed in a poker game embodiment. FIG. 13 can include the central display device 30 or the upper display device 32. FIG. 13 illustrates a plurality of randomly generated playing cards or a hand 122, which can form a winning combination according to the paytable 112 of FIG. 12. In FIG. 13, the game randomly generated the hand 122 that includes the eight of diamonds, the two of spades, the two of hearts, the ace of clubs and the ace of diamonds.

FIG. 13 also includes a preferably randomly generated wildcard, which is one of the playing cards. The game can assign one or more of the cards to be a wildcard at any point of the game. In this example the game has preferably randomly determined but alternatively predetermined that all aces are wildcards, as indicated by the message 124. The game can give any suitable desirable effect to a wildcard, however, the game preferably gives the known poker effect to a wildcard. That is, the game enables the wildcard to adopt or equate to any desired playing card value or symbol. The game can automatically and optimally determine which value or symbol with which to equate a wildcard. The preferred method of the present invention evaluates the player's winnings, according to the paytable 112, in two steps.

In a first step, the preferred method of the present invention evaluates or finds all winning playing card and playing card combinations before the game activates or equates the wildcard to a particular playing card. According to the paychart 112 of FIG. 12 and the hand 122, the player wins five credits for a two of a kind winning combination 114 for the two twos and five credits for a two of a kind winning combination 114 for the two aces. The first step of the method of the present invention provides ten credits to the player.

In a second step, the preferred method of the present invention equates the wildcard to one of the other non-wild cards of the hand 122. Since the wildcard preferably equates to only one other card, the player or game must in the second step optimally decide which non-wildcard of the hand 122 with which to equate. Since aces are wild in the hand 122, the game or player can equate the two aces to the eight of diamonds and create a full house winning combination 118 including three eight's over two two's. Alternatively, the game or player can equate the two aces to the two's (of spades and of hearts) and create a four of a kind winning combination 120. Since, according to the paytable 112 four of a kind 120 pays better than a full house 118, the game or player preferably equates the two aces to the two's.

In the second step, the player obtains 100 credits for the four of a kind winning combination 120. Overall, the player wins 110 credits in the poker game employing the preferred method of the present invention. FIG. 13 discloses the preferred wildcard effect for the method of the present invention in a poker machine embodiment, wherein the wildcard equates to one of the other non-wild cards of the hand 122. The present invention can alternatively equate the wildcard to each non-wildcard of the hand 122. In this embodiment the game provides a plurality of second step awards: (i) 100 credits for four two's, and (ii) 50 credits for the full house eight's over two's.

The draw poker game preferably contains one or more card exchanges, wherein the game enables the player to keep certain cards and discard others. That is, the player can for example keep a pair of kings and a wildcard and discard a four and a two. The game will issue two new replacement cards. The game can then enable another card exchange. The evaluation method applies to a draw poker game having a card exchange the same as described above. After the game enables the player to exchange cards, the game employs the evaluation sequence by: (i) providing an award for winning card combinations present before activating or equating the wildcard; and (ii) providing an award for winning card combinations present after activating or equating the wildcard.

Most poker games do not, and likewise the poker game of the present invention preferably does not provide a separate award for a full house and its constituent three of a kind and two of a kind. Likewise, poker games generally do not pay for one, four of a kind and two, two of a kind combinations. That is, in the alternative embodiment, the game equates the wildcard to each non-wildcard but preferably does so for one, the most profitable, winning combination.

Alternative Method

Figure 14A:
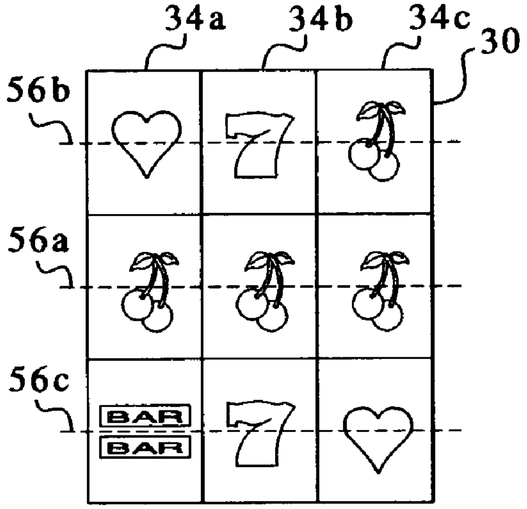
FIGS. 14A and 14B are front elevational views of a display device including the alternative method of the present invention in a slot machine embodiment, wherein the game replaces one or more symbols with one or more different symbols.
Figure 14B:
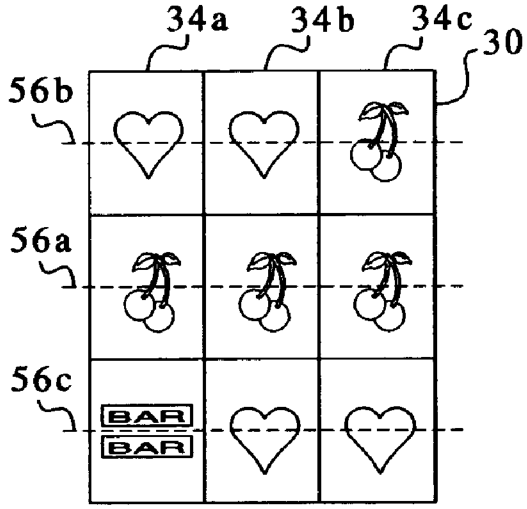

Referring now to FIGS. 14A and 14B, the present invention contemplates an alternative embodiment, illustrated here in connection with a slot machine embodiment, wherein the game replaces one or more symbols with one or more different symbols. That is, the replacement is not a wild symbol. The alternative method still applies a similar two step evaluation, wherein the game adds all awards from winning symbols or symbol combinations before the replacement to all awards from winning symbols or symbol combinations after the replacement.

The paytable 100 of FIG. 4 applies to and is used to describe the alternative slot machine method of the present invention including a central display device 30, three reels 34*a*, 34*b* and 34*c* and three paylines 56*a*, 56*b* and 56*c*. In this example of the present invention the heart symbol replaces a "7" symbol. In the first step of the evaluation, the player wins 50 credits for obtaining three cherry symbols along payline 56*a*. The game then replaces each "7" with a heart symbol, which results in the screen of FIG. 14B.

In the second step evaluation, the player again wins 50 credits for obtaining three cherry symbols along payline 56*a*, 100 credits for the heart—heart-cherry combination on reels 34*a*, 34*b* and 34*c* of payline 56*b* and 10 more credits for the heart—heart combination on reels 34*b* and 34*c* and payline 56*c*. The total for the second step evaluation is 160 credits and the total for the alternative slot machine embodiment round is 210.

Figure 15A:
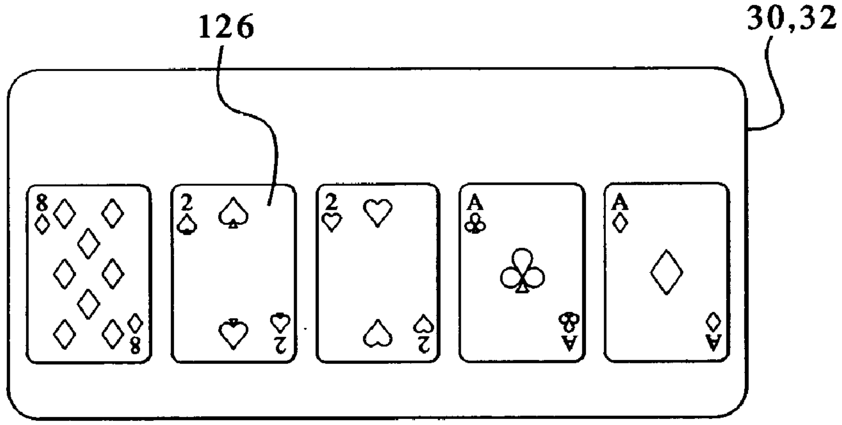
FIGS. 15A and 15B are front elevational views of a display device including the alternative method of the present invention in a poker or card game embodiment, wherein the game replaces one or more symbols with one or more different symbols.
Figure 15B:
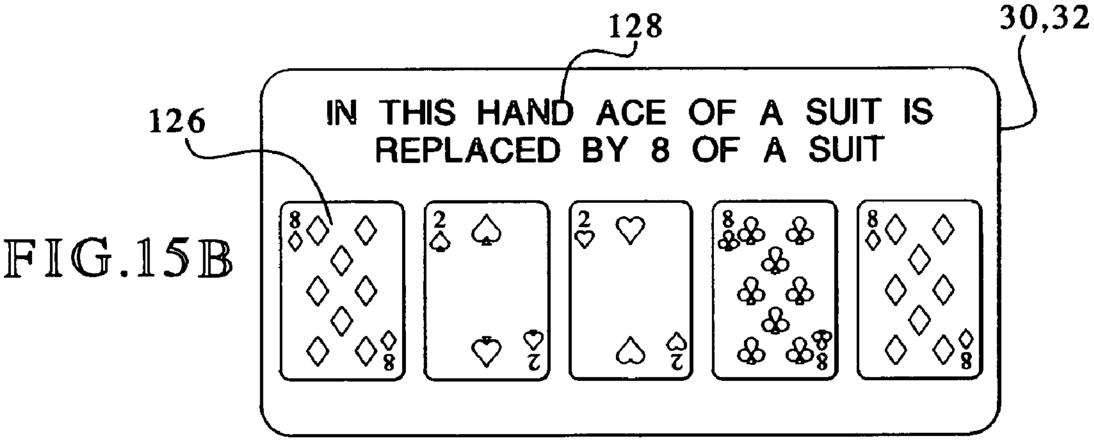

Referring now to FIGS. 15A and 15B, the present invention contemplates the alternative embodiment in connection with the poker game, wherein the game replaces one or more playing cards with one or more different playing cards. That is, the replacement is not a wildcard replacement wherein one card of a hand adopts or equates to another card of a hand. In FIGS. 15A and 15B, which are evaluated in conjunction with the paytable 112 of FIG. 12, one of the displays 30 or 32 includes a hand 126 and a message 128 indicating that an ace of a suit is replaced by an eight of the same suit.

FIG. 15A includes the initial hand 126 including an eight of diamonds, a two of spades, a two of hearts, an ace of clubs and an ace of diamonds. In the first evaluation of the alternative embodiment, the player receives five credits for the two of a kind two's and five credits for the two of a kind ace's, according to FIG. 12, for a total of 10 credits. For the second evaluation every ace is replaced by an eight of the same suit. The ace of clubs changes to the eight of clubs and the ace of diamonds changes to the eight of diamonds. The player therefore receives 50 credits for a full house eight's over two's, according to FIG. 12. The game contemplates enabling two of the same card to exist in one hand at the same time, e.g., two eight of diamonds as illustrated in FIG. 15B. The player again preferably does not win constituent combinations in the poker embodiment. The total win for the alternative method poker embodiment is 60 credits.

It should be appreciated that in both the alternative slot and poker embodiments, more than one symbol can replace more than one different symbol as desired by the implementor. In the alternative slot embodiment for example, a heart can replace a "7" and a cherry can replace a bar. In the alternative poker embodiment, the ace of a suit can be replaced by the eight of the same suit and the king of a suit can be replaced by the two of the same suit.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention claimed is:

1. A method for operating a slot machine including a plurality of reels and a plurality of symbols on said reels, said method comprising the steps of:

(a) maintaining a list of award-yielding symbol combinations of said plurality of symbols in a controller;

(b) randomly generating on a plurality of paylines associated with said reels a first set of the symbols from the plurality of symbols, said first set including a plurality of symbols generated on each of a plurality of the reels, and each of the symbols in the first set of symbols is adapted for individual replacement;

(c) providing a player an award for each award-yielding symbol combination appearing in said first set on any of the paylines before any of the symbols can be replaced;

(d) if a designated symbol occurs in the first set, said designated symbol causing a selection of selecting a plurality but not all of the symbols in the first set for individual replacement, said selected symbols including all of the plurality of symbols generated on the reel including the designated symbol and individually replacing each said selected symbol in the first set with one of the plurality of symbols to generate a second set of the symbols, the second set of symbols displayed in place of the first set of symbols; and (e) providing the player an award for each award-yielding symbol combination appearing in said second set on any of the paylines even if any said award yielding symbol combination in the second set appeared in the first set and even if an award was provided for said symbol combination in step (c).

2. The method of claim 1, wherein the step of individually replacing the symbols includes an animation of the symbols which are replaced.

3. The method of claim 1, wherein the step of individually replacing the symbols includes individually replacing the selected symbols without spinning the reels.

4. The method of claim 1, wherein generating the first set of symbols and second set of symbols is part of a bonus game.

5. The method of claim 1, wherein the step of replacing each selected symbol in the first set includes substituting a wild symbol for each selected symbol in the first set, and wherein each wild symbol functions as one of the plurality of symbols.

6. The method of claim 1, wherein the step of replacing each selected symbol of the first set includes substituting a wild symbol for each selected symbol in the first set, and wherein each said wild symbol sequentially functions as at least one of the plurality of symbols.

7. The method of claim 1, wherein the step of replacing each selected symbol includes individually replacing one of the other symbols on a plurality of reels, wherein said symbol functions as one of the plurality of symbols.

8. The method of claim 7, wherein the step of replacing each selected symbol in the first set includes substituting a wild symbol for at least one symbol on another one of said reels, wherein each said wild symbols function as one of the plurality of symbols.

9. The method of claim 1, wherein the step of replacing each selected symbol in the first set includes substituting a wild symbol for at least one other of the symbols in a row of symbols along a plurality of reels of the slot machine, wherein said wild symbol functions as one of the plurality of symbols.

10. The method of claim 1, wherein the steps (a) to (e) are provided to a player through a data network.

11. The method of claim 10, wherein the data network is an internet.

12. A method for operating a gaming device including a plurality of reels and a plurality of symbols on the reels, said method comprising the steps of:

(a) maintaining in a controller of said gaming device a list of award yielding symbol combinations of said plurality of symbols;

(b) generating a first set of said symbols on the reels, wherein one of said symbols in said first set is a first wild symbol, said first set including a plurality of generated symbols on each of a plurality of the reels;

(c) providing a player an award for each award yielding symbol combination appearing in said first set including any award yielding symbol combinations that include the first wild symbol, the first wild symbol functioning as one of the other symbols to maximize the award yielding combinations;

(d) the first wild symbol causing a selection of a plurality but not all of the symbols in the first set except for the first wild symbol in the set to be individually replaced, said symbols including all of the plurality of symbols generated on the reel including the first wild symbol and individually replacing each said selected symbol with a second wild symbol to create a second set of symbols that is displayed in place of the first set of symbols; and (e) providing the player an award for each award yielding symbol combination appearing in said second set including any award yielding symbol combinations created with the first wild symbol and any award yielding symbol combinations created with the first and the second wild symbols, wherein each of the first and the second wild symbols function as one of the symbols to maximize the award yielding symbol combinations, wherein the award for each award yielding symbol combination in the second set is in addition to the award for each award yielding symbol combination in the first set.

13. The method of claim 12, wherein the step of individually replacing each selected symbol in the first set includes substituting a wild symbol for at least one symbol of one row of symbols on the reels, wherein said row includes said generated wild symbol.

14. The method of claim 12, wherein the step of individually replacing each selected symbol in the first set includes substituting a wild symbol for at least one other predetermined generated symbol.

15. The method of claim 12, wherein the steps (a) to (e) are provided to a player through a data network.

16. The method of claim 15, wherein the data network is an internet.

17. A method for determining an award in a slot machine including a plurality of reels, a plurality of symbols on said reels and a plurality of award yielding combinations of said symbols, said method comprising the steps of:

(a) randomly generating on a plurality of paylines associated with the reels a first set of said symbols, said first set including a plurality of symbols on each of a plurality of reels;

(b) evaluating said first set to determine if any award yielding symbol combinations are displayed and providing a player an award for each award yielding symbol combination appearing in said first set on any of said paylines;

(c) if a designated symbol occurs in the first set, said designated symbol causing a selection of a plurality but not all of the symbols in said first set for individual replacement whether or not any award yielding symbol combinations are displayed in the first set, said symbols including at least two predetermined symbols on the reel of the designated symbol and individually replacing each said selected symbol with one of the symbols to create a second set of symbols that is displayed in place of the first set of symbols; and (d) evaluating said second set to determine if any award yielding symbol combinations are displayed and providing the player an award for each award yielding symbol combination appearing in said second set on any of said paylines including all award yielding symbol combinations in the second set even if an award was provided for such award yielding combinations in the first set and even if an award is provided for said symbol combination in step (b).

18. A method for operating a gaming device including a plurality of reels, a plurality of symbols on said reels and a plurality of award yielding combinations of said symbols, said method comprising the steps of:

(a) generating a first set of said symbols on the reels, wherein one of said symbols in said set is a first wild symbol and said first set includes a plurality of generated symbols on each of a plurality of the reels;

(b) providing a player an award for each award yielding symbol combination appearing in said first set, wherein said wild symbol functions as one of the symbols to maximize the award yielding symbol combinations in said first set;

(c) individually substituting a second wild symbol for each of a plurality but not all of the symbols in said first set except for said first wild symbol, said substituted symbols being predetermined symbols, to create a second set of symbols that is displayed in place of the first set of symbols; and (d) providing the player an award for each award yielding symbol combination appearing in said second set, including each award yielding combination including said first wild symbol only and including both the first and the second wild symbols and wherein each wild symbol functions as one of said symbols to maximize the award yielding symbol combinations in said second set, wherein the award for each award yielding symbol combination in the second set is in addition to the award for each award yielding symbol combination in the first set.

19. A slot machine comprising:

a plurality of reels and a plurality of paylines with the reels;

a plurality of symbols on said reels, said symbols including a wild symbol;

a plurality of symbol combinations that each yield an award if generated by said reels; and a processor which controls said reels, wherein said processor:

(i) causes the reels to generate a first set of said symbols along the paylines, said first set including a plurality of symbols on each of a plurality of the reels, (ii) provides an award to a player for each award yielding symbol combination in said first set on any of the paylines, said wild symbol functioning as at least one other non-wild symbol, (iii) if said wild symbol occurs in the first set, said wild symbol causing a substitution of another one of the non-wild symbols in said first set with another wild symbol at each of the plurality of generated symbols on the reel with the wild symbol to create a second set of symbols that is displayed in place of the first set of symbols, and (iv) provides an additional award to the player for each award yielding symbol combination in said second set on any of the paylines, regardless of whether the combination includes a wild symbol, wherein each wild symbol functions as at least one other non-wild symbol.

20. A gaming device comprising:

a processor;

a memory device which maintains a plurality of symbols and a plurality of award yielding symbol combinations, wherein the processor communicates with the memory device to:

generate a first set of symbols on a plurality of reels, wherein one of said symbols is a first wild symbol and where the first set includes a plurality of symbols on each of a plurality of the reels;

provide an award for each award yielding symbol combination appearing in said first set, wherein said first wild symbol functions as one of the symbols;

individually substitute a second wild symbol for a plurality but not all other non-wild symbols in said first set, said substituted symbols being all of the plurality of symbols on one of the reels to create a second set of symbols that is displayed in place of the first set of symbols; and provide an award for each award yielding symbol combination appearing in said second set, the combinations including the first wild symbol only and including both the first and second wild symbols, wherein each wild symbol including the first and second wild symbols function as one of the symbols.

* * * * *

UNITED STATES PATENT AND TRADEMARK OFFICE

CERTIFICATE OF CORRECTION

PATENT NO. : 7,070,502 B1
APPLICATION NO. : 09/687689
DATED : July 4, 2006
INVENTOR(S) : William J. Bussick et al.

It is certified that error appears in the above-identified patent and that said Letters Patent is hereby corrected as shown below:

In Claim 1, column 12, line 67, change “a selection of selecting a” to --a selection of a--.

Signed and Sealed this

Twenty-first Day of November, 2006

JON W. DUDAS
*Director of the United States Patent and Trademark Office*